(12) United States Patent
Kim et al.

(10) Patent No.: US 8,999,594 B2
(45) Date of Patent: Apr. 7, 2015

(54) UNIT CELL FOR FLAT-TUBULAR SOLID OXIDE FUEL CELL OR SOLID OXIDE ELECTROLYZER, AND FLAT-TUBULAR SOLID OXIDE FUEL CELL AND FLAT-TUBULAR SOLID OXIDE ELECTROLYZER USING THE SAME

(71) Applicants: Sun-Dong Kim, Daejeon (KR); Doo-Won Seo, Deajeon (SE); In-Sub Han, Chungcheongnam-do (KR); Ji-Haeng Yu, Daejeon (KR); Se-Young Kim, Gyeonggi-do (KR); Sang-Kuk Woo, Daejeon (KR)

(72) Inventors: Sun-Dong Kim, Daejeon (KR); Doo-Won Seo, Deajeon (SE); In-Sub Han, Chungcheongnam-do (KR); Ji-Haeng Yu, Daejeon (KR); Se-Young Kim, Gyeonggi-do (KR); Sang-Kuk Woo, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 44 days.

(21) Appl. No.: 13/772,179

(22) Filed: Feb. 20, 2013

(65) Prior Publication Data
US 2013/0266884 A1    Oct. 10, 2013

(30) Foreign Application Priority Data

Apr. 6, 2012  (KR) .......................... 10-2012-0035884

(51) Int. Cl.
| | |
|---|---|
| *H01M 2/40* | (2006.01) |
| *C25B 1/04* | (2006.01) |
| *H01M 8/04* | (2006.01) |
| *C25B 9/18* | (2006.01) |
| *H01M 8/12* | (2006.01) |
| *H01M 8/24* | (2006.01) |

(52) U.S. Cl.
CPC ............. *C25B 1/04* (2013.01); *H01M 8/04201* (2013.01); *Y02E 60/521* (2013.01); *Y02E 60/366* (2013.01); *Y02E 60/525* (2013.01); *C25B 9/18* (2013.01); *H01M 8/1213* (2013.01); *H01M 8/243* (2013.01)

(58) Field of Classification Search
CPC ..... Y02E 60/525; Y02E 60/50; H01M 8/243; H01M 2008/1293; H01M 8/0202; H01M 8/2425
USPC ......................................... 429/457, 508, 509
See application file for complete search history.

(56) References Cited

U.S. PATENT DOCUMENTS

| | | | |
|---|---|---|---|
| 7,351,477 B2 | 4/2008 | Yamaya et al. | |
| 2008/0003478 A1* | 1/2008 | Greiner et al. | 429/31 |
| 2012/0141903 A1* | 6/2012 | Kim et al. | 429/457 |

FOREIGN PATENT DOCUMENTS

| | | |
|---|---|---|
| JP | 2004-228050 A | 8/2004 |
| JP | 2005-019058 A | 1/2005 |
| JP | 2007-149509 A | 6/2007 |
| JP | 2008-270203 A | 11/2008 |
| JP | 2010-055916 A | 3/2010 |
| JP | 2011-181412 A | 9/2011 |

(Continued)

*Primary Examiner* — Stewart Fraser
(74) *Attorney, Agent, or Firm* — Enshan Hong; VLP Law Group LLP

(57) ABSTRACT

This invention relates to a unit cell for a flat-tubular solid oxide fuel cell or solid oxide electrolyzer, and a flat-tubular solid oxide fuel cell and a flat-tubular solid oxide electrolyzer using the same, and more particularly to a unit cell for a flat-tubular solid oxide fuel cell or solid oxide electrolyzer, wherein the unit cell includes a connector including connection parts, thus decreasing the thickness of the unit cell and reducing the size of a cell stack, and to a flat-tubular solid oxide fuel cell and a flat-tubular solid oxide electrolyzer using the same.

10 Claims, 3 Drawing Sheets

(56) References Cited

FOREIGN PATENT DOCUMENTS

| KR | 1020050021027 A | 3/2005 |
| KR | 10-2010-0072802 A | 7/2010 |
| KR | 10-2012-0032331 A | 4/2012 |
| WO | 2011/126289 A2 | 10/2011 |

* cited by examiner

UNIT CELL FOR FLAT-TUBULAR SOLID OXIDE FUEL CELL OR SOLID OXIDE ELECTROLYZER, AND FLAT-TUBULAR SOLID OXIDE FUEL CELL AND FLAT-TUBULAR SOLID OXIDE ELECTROLYZER USING THE SAME

CROSS REFERENCE TO RELATED APPLICATION

This application claims the benefit of Korean Patent Application No. KR 10-2012-0035884, filed Apr. 6, 2012, which is hereby incorporated by reference in its entirety into this application.

BACKGROUND OF THE INVENTION

1. Technical Field

The present invention relates to a unit cell for a flat-tubular solid oxide fuel cell or solid oxide electrolyzer, and a flat-tubular solid oxide fuel cell and a flat-tubular solid oxide electrolyzer using the same.

2. Description of the Related Art

Typically, a fuel cell is a high-efficiency clean power generation technique which converts hydrogen contained in a hydrocarbon material such as natural gas, coal gas, methanol, etc., and oxygen in air into electrical energy via an electrochemical reaction. The fuel cell is classified into, depending on the kind of electrolyte used, an alkaline fuel cell, a phosphate fuel cell, a molten carbonate fuel cell, a solid oxide fuel cell, and a polymer fuel cell.

An electrochemical reactor such as a solid oxide fuel cell, a high-temperature electrolyzer, etc., is classified into a flat type and a cylindrical type, depending on the shape thereof. Although the flat type exhibits high power density (power), a gas sealing area is large and thermal shock occurs due to a difference in the coefficient of thermal expansion between stacked materials, making it difficult to achieve a large-area device. The cylindrical type is comparatively superior in terms of resistance to thermal stress and mechanical strength, and may achieve a large-area device via extrusion, but is problematic because its power density is low.

A flat-tubular electrochemical reactor such as a flat-tubular solid oxide fuel cell having advantages of both the flat type and the cylindrical type electrochemical reactors is disclosed in Korean Unexamined Patent Publication No. 2005-0021027 and U.S. Pat. No. 7,351,477. In order to increase power, the flat-tubular electrochemical reactor is provided in the form of a cell stack, but the total thickness of the cell stack comprising stacked unit cells may increase in proportion to an increase in the thickness of unit cell, undesirably making it difficult to reduce the size of a fuel cell.

PRIOR ART REFERENCE

Patent Literature (Patent Literature 1) Korean Unexamined Patent Publication No. 2005-0021027
(Patent Literature 2) US Patent No. 7351477

SUMMARY OF THE INVENTION

Therefore, an object of the present invention is to provide a unit cell for a flat-tubular solid oxide fuel cell or solid oxide electrolyzer including a plurality of unit cells which are stacked, wherein the thickness of a connector may be decreased so that the thickness of a cell stack may decrease, and a plurality of unit cells may be stacked.

Another object of the present invention is to provide a unit cell for a flat-tubular solid oxide fuel cell or solid oxide electrolyzer and a flat-tubular solid oxide fuel cell and solid oxide electrolyzer using the same, wherein the manufacturing cost of the unit cell may decrease and the size thereof may be reduced.

In order to accomplish the above objects, the present invention provides a unit cell for a flat-tubular solid oxide fuel cell or solid oxide electrolyzer, comprising an anode (negative electrode) including a plurality of first gas passages therein; an electrolyte layer applied on the anode; a cathode (positive electrode) formed on the electrolyte layer; and a connector formed on the surface of the electrolyte layer opposite the surface on which the cathode is formed, wherein the connector includes a plurality of connection parts which are spaced apart from each other in a longitudinal direction of the unit cell to form a second gas passage.

In addition, the present invention provides a flat-tubular solid oxide fuel cell, comprising a cell stack formed by stacking a plurality of unit cells as above, and a current collector.

In addition, the present invention provides a flat-tubular solid oxide electrolyzer, comprising a cell stack formed by stacking a plurality of unit cells as above, and a current collector.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
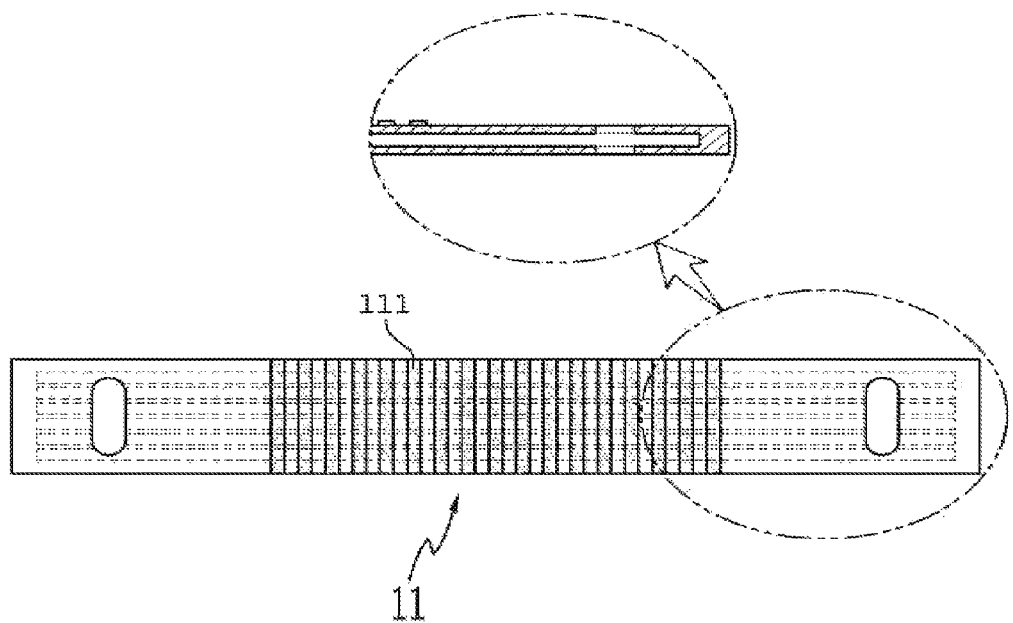
FIG. 1 illustrates a connector which is provided in a unit cell, according to an embodiment of the present invention.

Hereinafter, a detailed description will be given of the present invention.

The present invention provides a unit cell for a flat-tubular solid oxide fuel cell or solid oxide electrolyzer, which includes an anode having a plurality of first gas passages therein, an electrolyte layer applied on the anode, a cathode formed on the electrolyte layer, and a connector formed on the surface of the electrolyte layer opposite the surface on which the cathode is formed, wherein the connector includes a plurality of connection parts which are spaced apart from each other in a longitudinal direction of the unit cell in order to form a second gas passage.

A solid oxide fuel cell is configured such that, when hydrogen and air are respectively supplied as a first gas and a second gas to the electrodes of the unit cell having the electrolyte layer and the anode and the cathode formed on both surfaces thereof, a reduction reaction of oxygen occurs at the cathode, thus producing an oxygen ion, and the oxygen ion is transferred to the anode via the electrolyte layer and reacts with hydrogen which is supplied to the anode, thus producing water. As such, because electrons are produced at the anode and consumed at the cathode, when these two electrodes are connected, electric current flows.

Also, a solid oxide electrolyzer, which is the application of the solid oxide fuel cell, is a device for electrolyzing water vapor via an inverse reaction of the solid oxide fuel cell to produce hydrogen.

In the unit cell for a flat-tubular solid oxide fuel cell or solid oxide electrolyzer, the connector is responsible for enabling electrical flow between unit cells which are stacked.

According to the present invention, the connector includes a plurality of connection parts which are preferably spaced apart from each other in a longitudinal direction of the unit cell to form the second gas passage. When the connector is stacked to the anode, the thickness of stacked unit cells may be decreased because of the connection parts thereof, unlike a conventional irregular connector. Accordingly, the thickness of a cell stack formed by stacking a plurality of unit cells may be decreased, making it possible to reduce the size of a solid oxide fuel cell or solid oxide electrolyzer.

In addition, the connection parts may be spaced apart from each other in a wave form in a longitudinal direction of the unit cell, thus increasing the length of the second gas passage, and increasing the residence time of the second gas on the surface of the unit cell, ultimately increasing the efficiency of the solid oxide fuel cell or solid oxide electrolyzer.

In addition, the connector may include a plurality of connection parts and a support part, and the connection parts are spaced apart from each other in a longitudinal direction of the unit cell to form the second gas passage, and the support part is integratedly formed with the connection parts in a manner that it is attached to a lateral surface of the connection parts so as to support the connection parts. When this connector is stacked to the anode, the support part is provided to the lateral surface of the connection parts and thus supports them, unlike the conventional irregular connector, thereby lowering the thickness of stacked unit cells. Accordingly, the thickness of the cell stack including the stacked unit cells may be decreased, making it possible to reduce the size of the solid oxide fuel cell or solid oxide electrolyzer.

Specifically, the connector is preferably provided in the form of a comb in which a lateral surface of the connection parts is supported by the support part. As such, the lateral surface of the connection parts to which the support part is attached is provided to protrude from the outside of the unit cell, thus forming the second gas passage so as to supply the second gas to the cathode.

In order to decrease changes in electrical conductivity at different temperatures and reduce resistance, the connector is preferably formed of any one selected from the group consisting of Crofer alloy, silicon carbide, and composite materials including silicon carbide and carbon.

Also, the connector is preferably formed of silicon carbide fibers. The silicon carbide fibers do not lower the efficiency of a solid oxide fuel cell or a solid oxide electrolyzer which operates at high temperature, and may maintain high conductivity.

The present invention provides a solid oxide fuel cell including a cell stack formed by stacking the unit cells, and a current collector. As such, the unit cells may be stacked so that the connection parts of the connector of one unit cell are attached to the cathode of another unit cell, and the top and the bottom of the cell stack may be provided with a current collector so that electric current is collected. The current collector is preferably configured such that a collection plate and a manifold are integrated with each other.

The present invention provides a solid oxide electrolyzer including a cell stack formed by stacking the unit cells, and a current collector. As such, the unit cells may be stacked so that the connection parts of the connector of one unit cell are attached to the cathode of another unit cell, and the top and the bottom of the cell stack may be provided with a current collector so that electric current is supplied. The solid oxide electrolyzer is a device for generating a hydrogen fuel using an inverse reaction of the reaction which occurs in the solid oxide fuel cell, whereby water vapor is supplied to the cathode via the second gas passage formed by the connector, and electric current is supplied via the current collector provided to the top and the bottom of the stack, thus producing hydrogen.

The current collector is preferably provided to have irregularities at the portion which is bound to the unit cell for a flat-tubular solid oxide fuel cell or solid oxide electrolyzer. Upon binding of the unit cell and the current collector, the irregularities enable the solid oxide fuel cell or the solid oxide electrolzyer to be manufactured without the need for an additional connector, and the resistance to decrease, thus increasing fuel cell efficiency.

Below is a description of the present invention through the following examples.

The following examples are merely illustrative but are not construed to limit the scope of the present invention.

EXAMPLE 1

Unit Cell for Flat-Tubular Solid Oxide Fuel Cell or Solid Oxide Electrolyzer

Using a ceramic extruder, an anode was formed so as to provide first gas passages therein, and both ends thereof were sealed. Subsequently, holes were formed in both ends of the dried body so that the first gas passages of unit cells were connected. As illustrated in FIG. 1, a connector 11 including a plurality of connection parts 111 spaced apart from each other and made of silicon carbide (SiC) was applied on the upper surface of the anode. As such, the connector may be manufactured using SiC bulk, SiC fiber composite, Crofer, Inconel, Ag, Au, Pt or perovskite ceramic (LSM, LSCF, etc.) tape, but the present invention is not limited thereto.

An electrolyte layer was applied on the surface of the anode not coated with the connector, after which heat treatment was performed at 1350~1400° C. so that the connector and the electrolyte layer became dense. Subsequently, a cathode was applied on the surface of the electrolyte layer opposite the surface coated with the connector, after which heat treatment at 900~1200° C. was performed, thus manufacturing a unit cell for a flat-tubular solid oxide fuel cell or solid oxide electrolyzer.

EXAMPLE 2

Unit Cell for Flat-Tubular Solid Oxide Fuel Cell or Solid Oxide Electrolyzer

Figure 2:
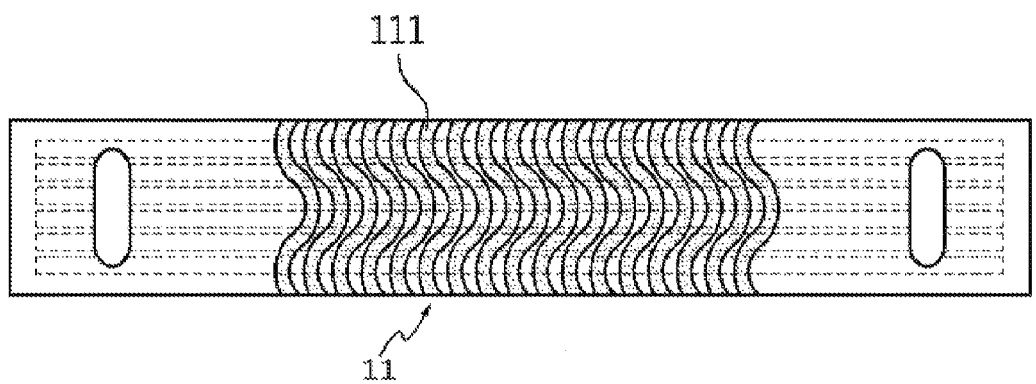
FIG. 2 illustrates a connector which is provided in a unit cell, according to another embodiment of the present invention.

Using a ceramic extruder, an anode was formed so as to provide first gas passages therein, and both ends thereof were sealed. Subsequently, holes were formed in both ends of the dried body so that the first gas passages of unit cells were connected. As illustrated in FIG. 2, a connector 11 including a plurality of connection parts 111 spaced apart from each other and made of silicon carbide (SiC) was applied on the upper surface of the anode. As such, the connector may be manufactured using SiC bulk, SiC fiber composite, Crofer, Inconel, Ag, Au, Pt or perovskite ceramic (LSM, LSCF, etc.) tape, but the present invention is not limited thereto.

An electrolyte layer was applied on the surface of the anode not coated with the connector, after which heat treatment was performed at 1350~1400° C. so that the connector and the electrolyte layer became dense. Subsequently, a cathode was applied on the surface of the electrolyte layer opposite the surface coated with the connector, after which heat treatment at 900~1200° C. was carried out, thus manufacturing a unit cell for a flat-tubular solid oxide fuel cell or solid oxide electrolyzer.

EXAMPLE 3

Unit Cell for a Flat-Tubular Solid Oxide Fuel Cell or Solid Oxide Electrolyzer

Figure 3:
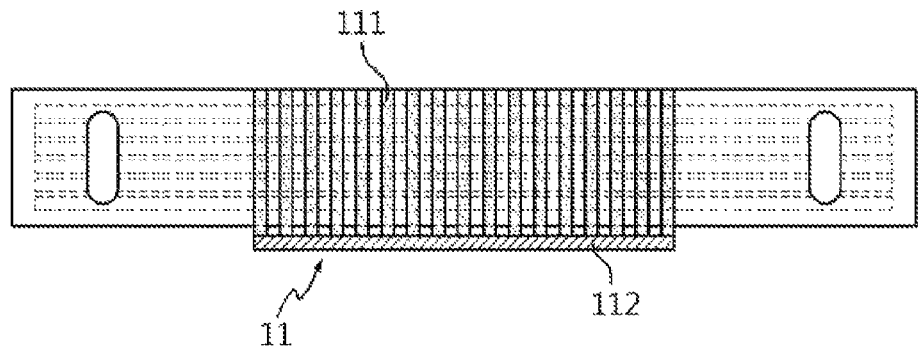
FIG. 3 illustrates a connector including connection parts and a support part, which is provided in a unit cell, according to a further embodiment of the present invention.

Using a ceramic extruder, an anode was formed so as to provide first gas passages therein, and both ends thereof were sealed. Subsequently, holes were formed in both ends of the dried body so that the first gas passages of unit cells were connected. As illustrated in FIG. 3, a connector 11 including a plurality of connection parts 111 and a support part 112 and made of silicon carbide (SiC) was applied on the lower surface of the anode. As such, the connector may be manufactured using SiC bulk, SiC fiber composite, Crofer, Inconel, Ag, Au, Pt or perovskite ceramic (LSM, LSCF, etc.) tape, but the present invention is not limited thereto.

The lateral surface of the connectors 111 to which the support part 112 was attached was provided to protrude from the outside of the unit cell along with the support part 112 so as to form a second gas passage. An electrolyte layer was applied on the surface of the anode not coated with the connector, after which heat treatment was performed at 1350~1400° C. so that the connector and the electrolyte layer became dense. Subsequently, a cathode was applied on the surface of the electrolyte layer opposite the surface coated with the connector, after which heat treatment at 900~1200° C. was carried out, thus manufacturing a unit cell for a flat-tubular solid oxide fuel cell or solid oxide electrolyzer.

EXAMPLE 4

Flat-Tubular Solid Oxide Fuel Cell

Figure 4:
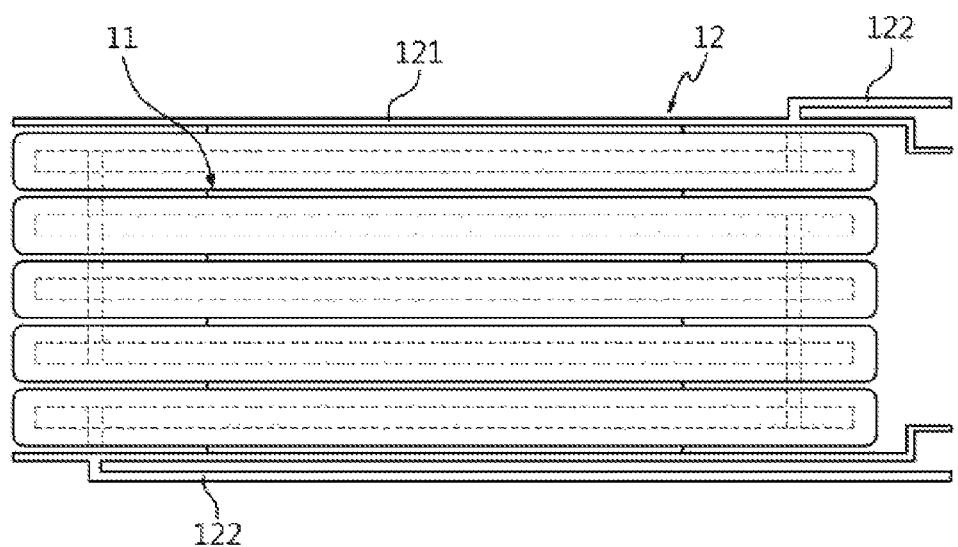
FIG. 4 illustrates a cell stack including the unit cells which are stacked according to the present invention.
Figure 5:
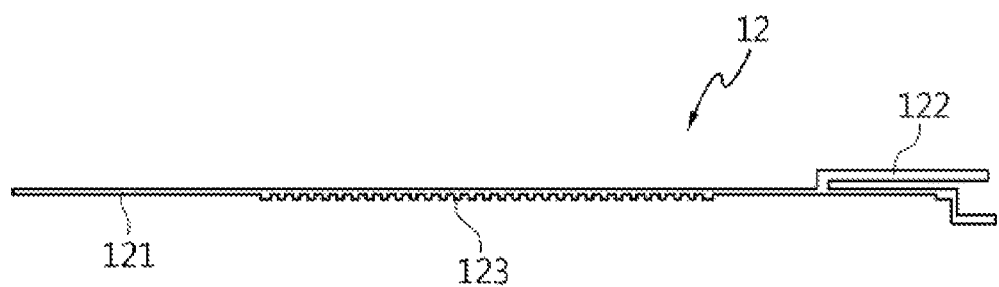
FIG. 5 illustrates a current collector of the cell stack, according to an embodiment of the present invention.
Figure 6:
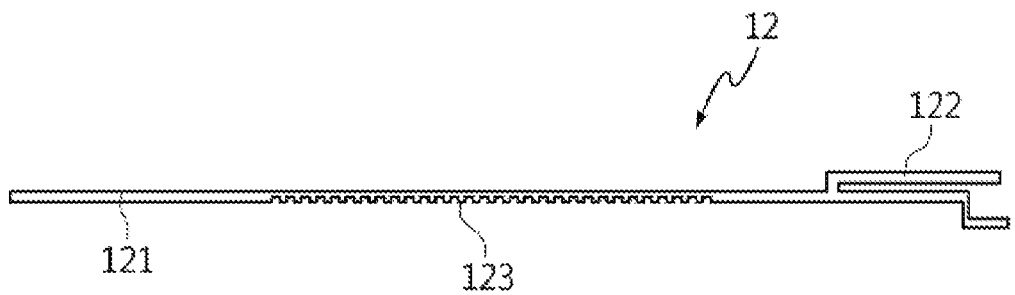
FIG. 6 illustrates a current collector of the cell stack, according to another embodiment of the present invention.

FIG. 4 illustrates a flat-tubular solid oxide fuel cell formed by stacking the unit cells of Example 3. As illustrated in FIG. 4, the unit cells were stacked so that the connector 11 of one unit cell was coupled with the cathode of another unit cell. Also, the lateral surface of the connection parts 111 to which the support part 112 was attached and the support part 112 were provided to protrude from the outside of the stacked unit cells, thus forming a second gas passage. Subsequently, the top and the bottom of the stacked unit cells were provided with a current collector 12, thereby manufacturing a solid oxide fuel cell and the current collector 12 is preferably configured such that a collection plate 121 and a manifold 122 are integrated with each other The upper current collector 12 was provided in the form of a current collector 12 including irregularities 123 as illustrated in FIG. 5 or 6, thus obviating the need for an additional connector between the current collector 12 and the cell stack, thereby increasing fuel cell efficiency.

Hydrogen as a first gas was supplied via a first gas feeder of the bottom unit cell among the stacked unit cells so as to flow through first gas passages, and air as a second gas was supplied to the lateral surface thereof so as to flow along the second gas passage, thereby generating electric current.

As described hereinbefore, the present invention provides a unit cell for a flat-tubular solid oxide fuel cell or solid oxide electrolyzer and a flat-tubular solid oxide fuel cell and a flat-tubular solid oxide electrolyzer using the same. According to the present invention, the use of a unit cell for a flat-tubular solid oxide fuel cell or solid oxide electrolyzer, which includes a connector including connection parts, can decrease the manufacturing cost, and can reduce the size of a flat-tubular solid oxide fuel cell or a flat-tubular solid oxide electrolyzer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A unit cell for a flat-tubular solid oxide fuel cell or solid oxide electrolyzer, comprising:
    an anode including a plurality of first gas passages therein;
    an electrolyte layer applied on the anode;
    a cathode formed on the electrolyte layer; and
    a connector formed on a surface of the electrolyte layer opposite a surface on which the cathode is formed,
    wherein the connector comprises a plurality of connection parts which are spaced apart from each other in a longitudinal direction of the unit cell to form a second gas passage, wherein the connector further comprises a support part, and the support part is integrally formed with the connection parts in a manner that the support part is attached to a lateral surface of the connection parts so as to support the connection parts.

2. The unit cell of claim 1, wherein the connection parts are spaced apart from each other in a wave form in the longitudinal direction of the unit cell.

3. The unit cell of claim 1, wherein the connector is provided in a comb shape, and the lateral surface of the connection parts is supported by the support part.

4. The unit cell of claim 1, wherein when one unit cell is stacked with another unit cell, the lateral surface of the connection parts to which the support part is attached is provided to protrude from outside of the unit cell thus forming the second gas passage.

5. The unit cell of claim 1, wherein the connector is formed of any one selected from the group consisting of Crofer alloy, silicon carbide, and composite materials including silicon carbide and carbon.

6. The unit cell of claim 1, wherein the connector is formed of silicon carbide fibers.

7. A flat-tubular solid oxide fuel cell, comprising a cell stack formed by stacking a plurality of unit cells of claim 1, and a current collector.

8. The solid oxide fuel cell of claim 7, wherein the current collector is provided with irregularities at a portion which is bound to the cell stack.

9. A flat-tubular solid oxide electrolyzer, comprising a cell stack formed by stacking a plurality of unit cells of claim 1, and a current collector.

10. The solid oxide electrolyzer of claim 9, wherein the current collector is provided with irregularities at a portion which is bound to the cell stack.

* * * * *